United States Patent [19]

Ueno et al.

[11] 4,444,796
[45] Apr. 24, 1984

[54] METHOD FOR PRODUCTION OF PET FOODS

[75] Inventors: Ryuzo Ueno, Nishinomiya; Toshio Matsuda, Itami; Shigeo Inamine, Kobe; Tatsuo Kanayama, Takarazuka; Yatsuka Fujita, Nishinomiya, all of Japan

[73] Assignee: Kabushiki Kaisha Ueno Seiyaku Oyo Kenkyujo, Osaka, Japan

[21] Appl. No.: 375,293

[22] Filed: May 5, 1982

Related U.S. Application Data

[63] Continuation of Ser. No. 175,738, Aug. 6, 1980, abandoned.

[30] Foreign Application Priority Data

Sep. 14, 1979 [JP]  Japan ................................ 54-117320

[51] Int. Cl.$^3$ ................................................. A23K 1/00
[52] U.S. Cl. ..................................... 426/335; 426/532; 426/623; 426/630; 426/805
[58] Field of Search ............... 426/532, 332, 623, 630, 426/636, 805

[56] References Cited

U.S. PATENT DOCUMENTS

| | | | |
|---|---|---|---|
| 3,716,381 | 2/1973 | Ueno et al. | 426/332 X |
| 4,001,449 | 1/1977 | Reardanz et al. | 426/805 X |
| 4,011,345 | 3/1977 | Bartsch | 426/805 X |
| 4,022,915 | 5/1977 | Zukerman | 426/805 X |
| 4,212,894 | 7/1980 | Franzen et al. | 426/805 X |

*Primary Examiner*—R. B. Penland
*Attorney, Agent, or Firm*—Sherman & Shalloway

[57] ABSTRACT

A method for producing a pet food with good storage stability having a water content of 20 to 45% by weight and a pH of 6.0 or below, which comprises admixing granules having a particle diameter of 300 to 1500 microns and comprising as a main ingredient a fine powder of sorbic acid having a particle size (Tyler's mesh) smaller than 250 mesh with starting materials for the pet food to disperse the sorbic acid powder in the form of discrete fine particles uniformly in said starting materials, and heating these materials simultaneously with, or after, the mixing.

8 Claims, No Drawings

METHOD FOR PRODUCTION OF PET FOODS

This is a continuation of application Ser. No. 175,738, filed Aug. 6, 1980, now abandoned.

This invention relates to a method for producing pet foods of a semi-moisture content which have improved storage stability while retaining good palatability to pets.

Pet foods are now generally classified into three types by their water content, namely (1) dry pet foods which generally have a water content of less than about 15% by weight, (2) soft and wet pet foods which generally have a water content of 20 to 45% by weight, and (3) pet foods which have a high water content of more than 45% by weight. The pet foods (3) having a high water content are generally sold in canned form. These canned pet foods require retorting because the high content of water is suitable for growth of microorganisms. Moreover, after can opening, the canned foods should be stored in a refrigerated state because they undergo spoilage very soon. Thus, the pet foods of high water content in canned form require high costs for processing and canning, and are inconvenient to store. The pet foods (1) and (2) are easy to pack and transport, and need not to be refrigerated after unpacking. They are easy to give to animals, and are convenient to the pet keepers.

On the other hand, the dry products (1) are hard and have a fragile feel and are not so pleasing to the palate of animals. In contrast, the products (2) of semi-moist content and the products (3) of high water content are readily acceptable to animals because these products have a palate close to meat. Accordingly, from the standpoint of palatability to pets, the products (2) and (3) are much preferred to the dry products (1), and from the standpoint of the convenience of packing, transporting and use, the dry products (1) and the products (2) of semi-moist content are superior. From an overall consideration of these factors, the products (2) of semi-moist content are the best.

The products of semi-moisture content are most unstable during storage. The dry products have resistance to spoilage because of their low water content. The products of high water content are retorted and canned, and do not undergo spoilage unless the cans are opened. Microorganisms which may cause spoilage are living in the products of semi-moist content because their water content is not so low as to inhibit growth of microorganisms and the temperature for heat-treatment of these products is not so high as to achieve complete sterilization. Even if the products are heat-sterilized completely, they are susceptible to secondary contamination because they are packed in a simplified form. The products of semi-moisture content, therefore will be spoiled soon if no measure is taken.

The most prevalent practice of destroying infectious microorganisms is to add sorbic acid or potassium sorbate as an antiseptic. Addition of an antiseptic alone does not usually provide sufficient storage stability, and other measures are used in combination. The other measures include, for example, (1) addition of large amounts of sugars and/or sugar alcohols to reduce water activity, (2) addition of 5 to 8% by weight of propylene glycol to utilize its antibacterial activity, and (3) reduction of pH to provide an environment unsuitable for growth of micoorganisms.

Storage stability is thus imparted to pet foods by taking the aforesaid measures. However, the storage stability so imparted is not completely satisfactory, and improvements are still required. According to the measure (1), the amount of sugars and/or sugar alcohols usually reaches as large as 20 to 35% by weight. Such a sugar content is too high for usual feeds of animals, and is detrimental to nutritional balance. Moreover, a high sugar content causes bad digestion in certain animals, especially old animals. According to the measure (2), a large amount of propylene glycol is used as an antiseptic. Although the toxicity of propylene glycol is low, it is by no means negligible. For example, WHO FOOD ADDITIVES SERIES 1974, No. 5 sets 2500 mg/kg bw. as a propylene glycol level which causes no toxicological effect in rats and dogs. If this level should be observed, a pet food having a propylene glycol content of 5% should be given in an amount of less than 50 g/kg bw. per day. It can be fully foreseen that long-term feeding of animals with pet foods containing a large amount of propylene glycol will adversely affect their health. The measure (3), on the other hand, poses no safety problem because it merely involves reducing the pH of pet foods. But in view of their palatability of animals, there is a limit to which the pH of the pet foods can be lowered.

Accordingly, none of these measures are entirely satisfactory because of the problems of nutritional balance, the health of animals, and palatability. Attempts to solve these problems will result in variations in the storage stability of pet foods.

The present inventors extensively investigated into the cause of such variations in storage stability, and found that the content of sorbic acid in pet foods varies to a greater extent than is expected. For example, five pellets (each weighing about 4 g) sampled at radom from one bag of commercially available pet food containing sorbic acid have been found to contain sorbic acid in an amount of 0.74, 0.45, 0.40, 0.53, and 0.61% by weight, respectively, showing great variations in content. Evidently, these variations will cause variations in storage stability of the pet foods. Further investigations have shown that the cause of such great variations is the very low solubility of sorbic acid. Potassium sorbate has higher solubility than sorbic acid. However, potassium sorbate is alkaline and is inferior in preservative effect than sorbic acid and the addition of an acid to make up for the inferior preservative effect results in an increased cost, and moreover animals prefer pet foods containing sorbic acid than those containing potassium sorbate. Hence, sorbic acid is superior as a preservative for pet foods. It is desired therefore to use sorbic acid as a preservative and remove variations in the storage stability of pet foods containing sorbic acid.

Pet foods having a semi-moist content contain 20 to 45% by weight of water, and usually contain 0.1 to 0.7% by weight of sorbic acid. If, therefore, a pet food contains 20% by weight of water, it contains 1 to 7 g of sorbic acid per 200 ml of water. If a pet food has a water content of 35% by weight, it contains 1 to 7 g of sorbic acid per 350 ml of water. The solubility of sorbic acid in water at 20° C. is about 0.2% by weight at a pH of 3, about 0.3% by weight at a pH of 4, about 0.5% by weight at a pH of 5, about 2.5% by weight at a pH of 6, and about 7.5% by weight at a pH of 6.5. Thus, at a pH of 6 or higher, the solubility of sorbic acid in water increases abruptly. Accordingly, if the pH of the pet food is about 6 or lower, the amount of sorbic acid added to the pet food is near the saturation solubility of it in water in the pet food or larger. Sugar or sodium chloride have the action of lowering the solubility of sorbic acid. For example, the solubility of sorbic acid in water at 20° C. is 0.16 g/100 ml, but 0.12 g/100 ml in water containing 25% of sugar, 0.05 g/100 ml in water containing 60% of sugar, 0.105 g/100 ml in water containing 5% of sodium chloride, and 0.038 g/100 ml in water containing 15% of sodium chloride. Accordingly, the solubility of sorbic acid in water in the pet food is probably lower than expected. The solubility of sorbic acid in propylene glycol is 5.5 g/100 ml, but when the propylene glycol content in the pet food is less than 20%, there is not much increase in solubility.

Commercially available sorbic acid usually have a particle size of 20 mesh (833 microns) to 100 mesh (147 microns) on a Tyler's sieve. One would normally think that if such sorbic acid powder is added to starting materials of a pet food and uniformly mixed and the mixture is heated, sorbic acid will be dissolved by heat and permeated into the entire pet food, and even if the excess of sorbic acid precipitates as crystals on cooling, the remaining sorbic acid is uniformly permeated into the pet food, and no variation in storage stability will occur. Contrary to this thought, variations in storage stability do occur.

The present inventors have now found that the occurrence of variations in storage stability can be prevented by using a special method of adding sorbic acid to pet foods.

Thus, according to this invention, there is provided a method for producing a pet food having a water content of 20 to 45% by weight, which comprises admixing granules having a particle size of 300 to 1500 microns containing a fine powder of sorbic acid having a particle size smaller than 250 mesh (Tyler) as a main ingredient to starting materials for the pet food to disperse the sorbic acid powder in the form of discrete fine particles uniformly in the starting materials for the pet food, heating these materials simultaneously with, or after, the mixing, and adjusting the pH of the final product to 6.0 or below.

The most important feature of the method of this invention is that the fine powder of sorbic acid is uniformly mixed with the starting materials for the pet food while heating them; or the fine powder of sorbic acid is uniformly mixed with the pet food starting materials and the resulting uniform mixture is heated. Sorbic acid dissolves in foodstuffs or feeds having a high water content and permeates through them entirely to achieve good storage stability. This cannot be expected in pet foods of semi-moisture content. It is important therefore than the fine powder of sorbic acid should be dispersed uniformly in the form of discrete fine particles, and be dissolved by heating. Mere dispersion of the fine powder of sorbic acid in the pet food materials without a heating step does not lead to uniform dissolving of sorbic acid in the pet food. Sorbic acid is intrinsically difficult to dissolve, and this is more so in pet foods. Hence, uniform dissolving is very difficult without a heating step.

Another important feature of the method of this invention is that the final pH of the pet food is adjusted to 6.0 or below. As is already known, the preservation effect of sorbic acid is brought about by the nondissociating molecules of sorbic acid, and the proportion of the nondissociating molecules based on the entire sorbic acid increases with decreasing pH. Thus, the preservation effect of sorbic acid increases at lower pH. For example, the proportion of the non-dissociating molecules is 1% at a pH of 7.0, 5% at a pH of 6.0, 25% at a pH of 5.3, 50% at a pH of 4.8, 75% at a pH of 4.3, and as high as 90% at a pH of 3.8. Thus, use of sorbic acid as a Preservative is advantageous at lower pH. If sorbic acid is to be added for its preservation effect, the pH should be adjusted to 6.0 or below. Since, however, lowering of pH causes a marked decrease in the solubility of sorbic acid, good storage stability cannot be obtained by a usual method of addition. The method of this invention gives a solution of these two contradictory problems.

When the pH of the pet food is higher than 6.0, the preservative effect of sorbic acid decreases and its solubility becomes higher. But even if a fine powder of sorbic acid is used as in the present invention, the results are not much different from those obtained by using a coarse powder of sorbic acid.

In order to dissolve a fine powder of sorbic acid uniformly in starting materials for a pet food, a method may be used which comprises adding the fine powder of sorbic acid to the starting materials. In actual commercial pet food-manufacturing plants, it is impossible to handle a fine powder of sorbic acid, because sorbic acid has a strong action of irritating the human mucous membranes, and scattering of fine powders of sorbic acid aggravates the working environment. For this reason, sorbic acid usually available on the market has a relatively coarse particle size of from 100 mesh (147 microns) to 20 mesh (833 microns) and does not contain smaller particles.

These problems associated with the use of a fine powder of sorbic acid have been solved by the method of this invention in the following manner. Specifically, the fine powder of sorbic acid is mechanically molded into granules having a size of 300 to 1500 microns. Since these granules do not contain a fine powder, handling of the granules does not aggravate the working environment. When the granules are mixed with the starting pet food materials, they immediately become discrete fine particles of sorbic acid and are uniformly mixed and dispersed.

The granules, as referred to herein, denote relatively coarse particles in the form of cylinders, spheres, flakes and other irregular shapes. The particle size of the fine powder of sorbic acid is smaller than 250 mesh (61 microns), preferably smaller than 400 mesh (37 microns). If the particle size of the fine powder is larger than 250 mesh (61 microns), the purpose of this invention cannot be achieved. On the other hand, if the particle size of granules obtained by molding the fine sorbic acid powder is smaller than 300 microns, they have increased tendency to scatter and possess poor flowability so that they lend themselves to inconvenient handling. If their particle size is larger than 1500 microns, it is difficult to dissolve them uniformly in the pet food materials.

Granules which do not scatter can be formed by adding water to a fine powder of sorbic acid, fully kneading them, molding the mixture into granules by a granulator, and drying the product. If the resulting sorbic acid granules are too soft, a fine powder may occur and scatter during handling. This can be avoided by adding a suitable binder, for example sugars such as sucrose, glucose, maltose, lactose, glucose syrup and sodium chloride, normally solid organic acids, normally solid organic acid salts, normally solid inorganic salts, CMC, MC, guar gum, gum arabic and gelatin. If water-insoluble substances, such as oils and fats, are used as a binder, the granules of sorbic acid remain undisintegrated in the pet food materials, and the object of this invention cannot be achieved. To assist in uniform dissolving of the fine powder of sorbic acid in the pet food materials, surface-active agents such as "Tween" (a registered trademark), "Span" (a registered trademark), and lecithin may be added.

The granules of sorbic acid can also be produced by a method which comprises spraying a solution containing a binder onto the fine powder of sorbic acid which is being fluidized in a fluidized bed.

Use of an organic acid, an acidic organic acid salt or an acidic inorganic acid salt as a binder is very advantageous because these compounds also act as a pH adjusted for pet foods. In this case, granulation can be performed by properly prescribing the ratio between the fine powder of sorbic acid and such an acidic substance so as to obtain the desired pH in the final product. Examples of these acidic substances are citric acid, tartaric acid, malic acid, adipic acid, succinic acid, fumaric acid, sodium citrate, sodium fumarate, glucono-delta-lactone monosodium phosphate, and sodium acidic pyrophosphate. These acidic substances may be used in combination with each other. Fumaric acid is only sparingly soluble in water, but can be favorably used if it is converted into a fine powder having a size smaller than 250 mesh (61 microns) as is the case with sorbic acid.

As stated hereinabove, the final pH of the pet food must be 6.0 or below in order to achieve the preservative effect of sorbic acid. It has also been stated hereinabove that a fine powder of sorbic acid may be granulated by mixing it with an acidic substance. The pH of the final product can also be adjusted by adding sorbic acid granules and the acidic substance separately to the pet food materials. In this procedure, not only the above-exemplified substances, but also liquid acidic substances such as acetic acid, lactic acid, phosphoric acid and phytic acid can be used.

The sorbic acid granules are added to the pet food materials so that they mix with each other, and the fine particles of sorbic acid are individually dispersed and dissolved uniformly in the pet foods. The pet food manufacturing process includes a heating step for sterilization and cooking. The addition of sorbic acid granules must be effected before or during the heating step because the uniformly dispersed sorbic acid powder is dissolved for the first time in the heating step and permeated throughout the pet food. This operation can be performed by a method which comprises mixing the sorbic acid granules with the pet food materials in a kneader and then pelletizing the mixture in an extrusion molding machine capable of performing heating, or by a method which comprises heating the pet food materials and the sorbic acid granules with mixing in a kneader capable of performing heating, and molding the hot mixture into pellets in an extruder.

Pet foods to which granules of sorbic acid are added in accordance with this invention have a water content of 20 to 45% by weight and a pH of 6.0 or below. Those pet foods which meet these requirements but contain very large amounts of sugars and/or sugar alcohols without consideration to nutritional balance and the palatability to animals, or contain a large amount of propylene glycol without consideration to the health of animals are not preferred in this invention. Pet foods to which the sorbic acid granules are favorably added in accordance with this invention are those having a sugar and/or sugar alcohol content of not more than 20% by weight and a propylene glycol content of not more than 3% in addition to meeting the aforesaid requirements, and which are well balanced in nutrition, are not detrimental to health and meet the taste of animals.

The amount of the sorbic acid granules added to the pet food is preferably from 0.1% by weight to 0.7% by weight as sorbic acid. If the amount is less than the specified limit, the antiseptic effect of sorbic acid cannot be expected. If the amount exceeds the specified limit, the excess of sorbic acid beyond its saturation solubility is present as crystals, and is not involved in producing a preservative effect. Only that portion of sorbic acid which is dissolved in water has to do with the preservative effect.

The following Examples illustrate the method of this invention more specifically. All parts and percentages in these examples are by weight.

EXAMPLE 1

A pet food was produced by the following recipe and method, and subjected to a spoilage test. In this Example, a difference in preservative effect was examined between the use of a commercially available potassium sorbate or sorbic acid powder as a preservative and the use of granules of sorbic acid (obtained in accordance with the recipe and method described below).

(1) Recipe and method of production of pet food

| Recipe | |
| --- | --- |
| By-products of beef | 47% |
| Sugar | 15% |
| Soybean meal | 28% |
| Propylene glycol | 2% |
| Citric acid | 0.1% |
| Water | 7.9% |
| | 100% |

Method

A jacketed kneader was provided, and hot water at 90° C. was passed through the jacket to heat it. The by-products of beef were put into the kneader, and heated for 5 minutes with stirring. Then, sugar and soybean meal were put into it, and stirred for 2 minutes under heat. Finally, propylene glycol, citric acid, water and the antiseptic were put into the kneader, and stirred for 8 minutes under heat. The mixture was molded into pellets having a diameter of 5 mm using an extrusion pelletizer.

(2) Recipe and method of production of sorbic acid granules

A commercially available sorbic acid powder was pulverized by a pulverizer to form a fine powder of sorbic acid having an average particle diameter of about 20 microns. A solution of 9.9 parts of sugar and 0.1 part of high-purity soybean lecithin in 20 parts of water was added to 90 parts of the fine powder of sorbic acid, and they were fully kneaded in a kneader. The mixture was molded into cylindrical granules having a diameter of 0.8 mm in an extrusion granulator, and then dried.

(3) Method for testing spoilage of pet foods

A suspension of spores of mold was uniformly sprayed onto the pet food, and then 200 g of the infected petfood was packed in each of polyethylene bags. The bags were closed by heat sealing, and stored at 30° C. to observe growth of mold. In one test lot, 5 bags were used.

The suspension used was a suspension containing $10^6$/ml of spores of mold grown on commercially available pet food. The amount of the spore suspension sprayed was 1 ml per 200 g of the pet food.

(4) Methods for measurement of the water content and pH of pet food

Water content

Five grams of a finely crushed pet food was put into a petri dish, and dried at 105° C. for 20 hours. The weight loss on drying was defined as the water content of the pet food.

marked difference shows the advantage of using sorbic acid.

(2) There is a clear difference between test lots containing the commercially available sorbic acid powder and test lots containing granules of sorbic acid (the invention). The test lots containing the granules of sorbic acid show better results and are free from variations in storage stability. In the test lots containing the commercially available sorbic acid powder, variations in storage stability are noted. In the same bag, pellets infected by mold and pellets free from infection of mold exist together, and storage stability varied from pellet to pellet. In pet foods produced on a mass-production basis in commercial plants, mixing tends to be less uniform than small-quantity production in laboratories, and the variations of storage stability will be greater.

TABLE 1

| Test lots (amount added, %) | | pH | Water content (%) | Storage period (days at 30° C.) | | | | | |
|---|---|---|---|---|---|---|---|---|---|
| | | | | 15 | 30 | 45 | 60 | 75 | 90 |
| Potassium sorbate powder | 0.10 | 6.21 | 30.8 | + + + + + | | | | | |
| | 0.15 | 6.23 | 32.3 | + + + + + | | | | | |
| | 0.20 | 6.28 | 31.2 | + + + + + | | | | | |
| | 0.25 | 6.31 | 32.1 | − − − − − | + + + + + | | | | |
| | 0.30 | 6.33 | 30.9 | − − − − − | − − − − − | + + + + + | | | |
| | 0.35 | 6.35 | 31.8 | − − − − − | − − − − − | − − − − − | + + + + + | | |
| | 0.40 | 6.37 | 31.5 | − − − − − | − − − − − | − − − − − | − − − − − | − − − − − | + + + + + |
| | 0.45 | 6.40 | 32.1 | − − − − − | − − − − − | − − − − − | − − − − − | − − − − − | − − − − − |
| | 0.50 | 6.42 | 32.3 | − − − − − | − − − − − | − − − − − | − − − − − | − − − − − | − − − − − |
| Commercially available sorbic acid powder | 0.12 | 6.18 | 32.1 | + + + + + | | | | | |
| | 0.14 | 6.15 | 31.8 | − − − − − | + + + + + | | | | |
| | 0.16 | 6.11 | 31.2 | − − − − − | − − − − − | + + − − − | + + + + + | | |
| | 0.18 | 6.08 | 32.3 | − − − − − | − − − − − | + − − − − | + − − − − | + + + − − | + + + + + |
| | 0.20 | 6.04 | 31.5 | − − − − − | − − − − − | − − − − − | + − − − − | + − − − − | + + − − − |
| | 0.22 | 6.01 | 31.3 | − − − − − | − − − − − | − − − − − | − − − − − | − − − − − | − − − − − |
| | 0.24 | 5.98 | 31.4 | − − − − − | − − − − − | − − − − − | − − − − − | − − − − − | − − − − − |
| | 0.26 | 5.95 | 31.1 | − − − − − | − − − − − | − − − − − | − − − − − | − − − − − | − − − − − |
| | 0.28 | 5.92 | 31.9 | − − − − − | − − − − − | − − − − − | − − − − − | − − − − − | − − − − − |
| Granules of fine sorbic acid powder* | 0.13(0.12) | 6.17 | 31.6 | + + + + + | | | | | |
| | 0.16(0.14) | 6.14 | 31.1 | − − − − − | + + + + + | | | | |
| | 0.18(0.16) | 6.11 | 30.9 | − − − − − | − − − − − | + + + + + | | | |
| | 0.20(0.18) | 6.07 | 32.2 | − − − − − | − − − − − | − − − − − | − − − − − | + + + + + | |
| | 0.22(0.20) | 6.03 | 31.9 | − − − − − | − − − − − | − − − − − | − − − − − | − − − − − | − − − − − |
| | 0.24(0.22) | 6.00 | 32.2 | − − − − − | − − − − − | − − − − − | − − − − − | − − − − − | − − − − − |
| | 0.27(0.24) | 5.97 | 32.1 | − − − − − | − − − − − | − − − − − | − − − − − | − − − − − | − − − − − |
| | 0.29(0.26) | 5.95 | 31.8 | − − − − − | − − − − − | − − − − − | − − − − − | − − − − − | − − − − − |
| | 0.31(0.28) | 5.92 | 32.2 | − − − − − | − − − − − | − − − − − | − − − − − | − − − − − | − − − − − |
| Not added | | 6.22 | 31.7 | + + + + + | | | | | |

*The parenthesized figures represent the net amount of sorbic acid.

pH

Five grams of a finely crushed pet food was mixed with 45 ml of water, and they were homogenized. The pH of the homogenized product was measured by a glass electrode pH meter.

(5) Test results

The results of the spoilage test, and the pH and water content of the pet foods are shown in Table 1. The following conclusions can be drawn from the data given in the table.

(1) Test lots containing potassium sorbate powder had very poor storage stability which was about ½ of that of test lots containing sorbic acid powder. This is because potassium sorbate is alkaline and with increasing amount of potassium sorbate, the pet food increases in alkalinity to reduce the preservative effect of sorbic acid. On the other hand, the test lots containing sorbic acid powder decrease in pH with increasing amount of sorbic acid because sorbic acid is acidic. Thus, the preservative effect of sorbic acid is fully exhibited. This

EXAMPLE 2

The effect of a commercially available sorbic acid powder was compared with that of granules of sorbic acid at three different pH values. The recipe and method for production of a pet food were as follows: The method of spoilage test and the method for measuring pH and water content were as the same as in Example 1.

(1) Recipe and method for production of pet food

| Recipe | |
|---|---|
| By-products of beef | 6% |
| By-products of chicken flesh | 4% |
| Hydrolyzate of starch | 5% |
| Soybean meal | 13% |
| Sugar | 10% |
| Potato starch | 35% |
| Distilled water | 27% |
| | 100% |

Method

A jacketed mixer was used, and hot water at 90° C. was passed through the jacket. The mixer was charged with the soybean meal, sugar, potato starch and the commercially available sorbic acid powder or the granules of sorbic acid, and they were mixed for 3 minutes. Then, the by-products of beef and the by-products of chicken flesh were added, and mixed for 1 minute. Subsequently, the starch hydrolyzate and water were added and mixed for 8 minutes. The mixture was pelletized by an extrusion pelletizer. The pH adjustment of the pet food was performed by dissolving a suitable amount of sodium hydroxide for adjusting the pH to an alkaline side or a suitable amount of citric acid for adjusting the pH to an acidic side to water to be added to the food.

(2) The recipe and method for producing granules of sorbic acid

A commercially available sorbic acid powder was pulverized by a pulverizer to obtain a fine powder of sorbic acid having an average particle size of about 25 microns. A solution of 9.9 parts of sodium chloride and 0.1 part of high-purity soybean lecithin in 20 parts of water was added to 90 parts of the resulting fine powder of sorbic acid. They were kneaded by a kneader and molded into cylindrical granules having a diameter of 0.8 mm using an extrusion granulator, and dried. The granules contained 90% of sorbic acid.

(3) Results of the spoilage test

The results of the spoilage tests and the pH and water contents of the pet foods are shown in Tables 2 to 4. The following conclusions can be drawn from these tables.

(1) The preservative effect of sorbic acid increases with decreasing pH.

(2) When the pH is high, no appreciable difference in preservative effect is noted between the commercially available sorbic acid powder and the granules of the fine sorbic acid. But at lower pH, a clear difference is noted between them, and test lots containing the granules of sorbic acid showed better results.

TABLE 2

| Test lots (amount added, %) | | pH | Water content (%) | Storage period (days at 30°) | | | | | |
|---|---|---|---|---|---|---|---|---|---|
| | | | | 15 | 30 | 45 | 60 | 75 | 90 |
| Commercially available sorbic acid powder | 0.30 | 6.49 | 35.8 | + + + + + | | | | | |
| | 0.35 | 6.55 | 35.0 | − − − − − | + + + + + | | | | |
| | 0.40 | 6.51 | 36.3 | − − − − − | − − − − − | − − − − − | + + + + + | | |
| | 0.45 | 6.57 | 36.0 | − − − − − | − − − − − | − − − − − | − − − − − | − − − − − | + + + + + |
| | 0.50 | 6.56 | 35.1 | − − − − − | − − − − − | − − − − − | − − − − − | − − − − − | − − − − − |
| | 0.55 | 6.51 | 35.7 | − − − − − | − − − − − | − − − − − | − − − − − | − − − − − | − − − − − |
| | 0.60 | 6.59 | 34.9 | − − − − − | − − − − − | − − − − − | − − − − − | − − − − − | − − − − − |
| | 0.65 | 6.60 | 35.0 | − − − − − | − − − − − | − − − − − | − − − − − | − − − − − | − − − − − |
| | 0.70 | 6.55 | 36.0 | − − − − − | − − − − − | − − − − − | − − − − − | − − − − − | − − − − − |
| Granules of fine sorbic acid powder* | 0.33(0.30) | 6.50 | 35.1 | + + + + + | | | | | |
| | 0.39(0.35) | 6.53 | 36.2 | − − − − − | + + + + + | | | | |
| | 0.44(0.40) | 6.51 | 35.5 | − − − − − | − − − − − | − − − − − | + + + + + | | |
| | 0.50(0.45) | 6.58 | 35.0 | − − − − − | − − − − − | − − − − − | − − − − − | − − − − − | + + + + + |
| | 0.56(0.50) | 6.50 | 35.3 | − − − − − | − − − − − | − − − − − | − − − − − | − − − − − | − − − − − |
| | 0.61(0.55) | 6.49 | 35.9 | − − − − − | − − − − − | − − − − − | − − − − − | − − − − − | − − − − − |
| | 0.67(0.60) | 6.52 | 36.0 | − − − − − | − − − − − | − − − − − | − − − − − | − − − − − | − − − − − |
| | 0.72(0.65) | 6.50 | 35.2 | − − − − − | − − − − − | − − − − − | − − − − − | − − − − − | − − − − − |
| | 0.78(0.70) | 6.50 | 34.9 | − − − − − | − − − − − | − − − − − | − − − − − | − − − − − | − − − − − |
| Not added | | 6.53 | 35.3 | + + + + + | | | | | |

*The parenthesized figures represent the net amount of sorbic acid.

TABLE 3

| Test lots (amount added, %) | | pH | Water content (%) | Storage period (days at 30° C.) | | | | | |
|---|---|---|---|---|---|---|---|---|---|
| | | | | 15 | 30 | 45 | 60 | 75 | 90 |
| Commercially available sorbic acid powder | 0.22 | 5.91 | 36.2 | + − − − − | + + + + + | | | | |
| | 0.24 | 5.95 | 35.2 | − − − − − | + + − − − | + + + + − | + + + + + | | |
| | 0.26 | 5.92 | 36.1 | − − − − − | − − − − − | − − − − − | + + − − − | + + + + + | |
| | 0.28 | 5.98 | 35.7 | − − − − − | − − − − − | − − − − − | + − − − − | + + + − − | + + + + + |
| | 0.30 | 5.93 | 35.6 | − − − − − | − − − − − | − − − − − | − − − − − | − − − − − | − − − − − |
| | 0.32 | 5.92 | 35.5 | − − − − − | − − − − − | − − − − − | − − − − − | − − − − − | − − − − − |
| | 0.34 | 5.89 | 36.0 | − − − − − | − − − − − | − − − − − | − − − − − | − − − − − | − − − − − |
| | 0.36 | 5.94 | 36.0 | − − − − − | − − − − − | − − − − − | − − − − − | − − − − − | − − − − − |
| | 0.38 | 5.94 | 35.4 | − − − − − | − − − − − | − − − − − | − − − − − | − − − − − | − − − − − |
| Granules of fine sorbic acid powder* | 0.24(0.22) | 5.95 | 36.2 | − − − − − | + + + + + | | | | |
| | 0.27(0.24) | 5.96 | 35.0 | − − − − − | − − − − − | − − − − − | + + + + + | | |
| | 0.29(0.26) | 5.93 | 35.1 | − − − − − | − − − − − | − − − − − | − − − − − | − − − − − | + + + + + |
| | 0.31(0.28) | 5.93 | 35.8 | − − − − − | − − − − − | − − − − − | − − − − − | − − − − − | − − − − − |
| | 0.33(0.30) | 5.98 | 35.6 | − − − − − | − − − − − | − − − − − | − − − − − | − − − − − | − − − − − |
| | 0.36(0.32) | 5.89 | 35.6 | − − − − − | − − − − − | − − − − − | − − − − − | − − − − − | − − − − − |
| | 0.38(0.34) | 5.88 | 36.1 | − − − − − | − − − − − | − − − − − | − − − − − | − − − − − | − − − − − |
| | 0.40(0.36) | 5.96 | 35.0 | − − − − − | − − − − − | − − − − − | − − − − − | − − − − − | − − − − − |
| | 0.42(0.38) | 5.93 | 36.1 | − − − − − | − − − − − | − − − − − | − − − − − | − − − − − | − − − − − |
| Not added | | 5.91 | 35.9 | + + + + + | | | | | |

*The parenthesized figures represent the net amount of sorbic acid.

TABLE 4

| Test lots (amount added, %) | | pH | Water content (%) | Storage period (days at 30° C.) | | | | | |
|---|---|---|---|---|---|---|---|---|---|
| | | | | 15 | 30 | 45 | 60 | 75 | 90 |
| Commercially available sorbic acid powder | 0.12 | 5.19 | 35.5 | + + + + + | | | | | |
| | 0.14 | 5.20 | 36.0 | + + + − − | + + + + + | | | | |
| | 0.16 | 5.20 | 35.9 | − − − − − | + + + + + | | | | |
| | 0.18 | 5.21 | 37.0 | − − − − − | − − − − − | + + − − − | + + + + − | + + + + + | |
| | 0.20 | 5.19 | 35.5 | − − − − − | + − − − − | + − − − − | + − − − − | + + + − − | + + + + − |
| | 0.22 | 5.20 | 36.1 | − − − − − | − − − − − | + − − − − | + − − − − | + + + − − | + + + + − |
| | 0.24 | 5.21 | 36.0 | − − − − − | − − − − − | − − − − − | − − − − − | − − − − − | − − − − − |
| | 0.26 | 5.21 | 35.6 | − − − − − | − − − − − | − − − − − | − − − − − | − − − − − | − − − − − |
| | 0.28 | 5.22 | 36.2 | − − − − − | − − − − − | − − − − − | − − − − − | − − − − − | − − − − − |
| Granules of fine sorbic acid powder* | 0.13(0.12) | 5.22 | 37.1 | + + + + + | | | | | |
| | 0.16(0.14) | 5.21 | 35.1 | − − − − − | + + + + + | | | | |
| | 0.18(0.16) | 5.21 | 35.3 | − − − − − | − − − − − | − − − − − | − − − − − | + + + + + | |
| | 0.20(0.18) | 5.20 | 36.1 | − − − − − | − − − − − | − − − − − | − − − − − | − − − − − | − − − − − |
| | 0.22(0.20) | 5.20 | 36.8 | − − − − − | − − − − − | − − − − − | − − − − − | − − − − − | − − − − − |
| | 0.24(0.22) | 5.21 | 35.5 | − − − − − | − − − − − | − − − − − | − − − − − | − − − − − | − − − − − |
| | 0.27(0.24) | 5.19 | 35.1 | − − − − − | − − − − − | − − − − − | − − − − − | − − − − − | − − − − − |
| | 0.29(0.26) | 5.19 | 36.6 | − − − − − | − − − − − | − − − − − | − − − − − | − − − − − | − − − − − |
| | 0.31(0.28) | 5.20 | 36.0 | − − − − − | − − − − − | − − − − − | − − − − − | − − − − − | − − − − − |
| Not added | | 5.20 | 36.5 | + + + + + | | | | | |

*The parenthesized figures represent the net amount of sorbic acid.

EXAMPLE 3

In this Example, the relation of the particle size of the sorbic acid powder constituting the granules to the storage stability of a pet food was examined. The sorbic acid powders used were a commercially available sorbic acid powder [20 mesh (833 microns) to 100 mesh (147 microns); average particle size of about 208 microns], a powder obtained by pulverizing the above commercially available sorbic acid powder to a size of 60 mesh (246 microns) to 250 mesh (61 microns) with an average particle size of about 147 microns, and a powder obtained by pulverizing the above commercially available sorbic acid powder by a micropulverizer to a size smaller than 250 mesh (61 microns (average particle size about 37 microns). The recipe and method for producing sorbic acid granules, and the recipe and method of producing pet foods were as follows: The spoilage test and the measurement of pH and water content were the same as in Example 1.

(1) Recipe and method of producing pet food

| Recipe | |
|---|---|
| By-products of beef | 8% |
| By-products of pork | 4% |
| Soybean meal | 10% |
| Potato starch | 35% |
| Sugar | 10% |
| Sorbitol | 3% |
| Water | 30% |
| | 100% |

Method

A jacketed mixer was provided, and hot water at 90° C. was passed through the jacket. The soybean meal, sugar, potato starch and sorbic acid granules were put into it and mixed under heat for 2 minutes. Then, the by-products of the meats were fed into the mixer, and mixed under heat for 3 minutes. Finally, sorbitol and water were added, and mixed under heat for 5 minutes. The resulting mixture was pelletized by an extrusion pelletizer to form a pet food.

(2) Recipe and method of producing sorbic acid granules

Sixty parts of each of the sorbic acid powders were mixed with 39 parts of a fine powder of fumaric acid having an average particle diameter of about 20 microns in a mixer. A solution of 1 part of sugar in 20 parts of water was put into the mixer. The resulting mixture was granulated by a granulator having a net with a diameter of 1 mm, and dried.

(3) Results of the spoilage test

The results of the spoilage test and the pH and water content of the pet foods are shown in Table 5. The granules composed of a fine sorbic acid powder (average diameter 37 microns) showed less variations in the storage stability of a pet food than the granules composed of the commercially available sorbic acid powder or the granules composed of relatively coarse sorbic acid powder (average particle diameter 147 microns).

TABLE 5

| Test lots (amount added, %) | | pH | Water content (%) | Storage period (days at 30° C.) | | | | | |
|---|---|---|---|---|---|---|---|---|---|
| | | | | 15 | 30 | 45 | 60 | 75 | 90 |
| Commercially available sorbic acid powder (average particle size 208 microns) | 0.23 | 5.49 | 36.5 | + + + + + | | | | | |
| | 0.27 | 5.42 | 36.7 | + + + − − | + + + + + | | | | |
| | 0.30 | 5.38 | 35.9 | − − − − − | + + − − − | + + + + − | + + + + + | | |
| | 0.33 | 5.30 | 37.0 | − − − − − | + + − − − | + + + − − | + + + + + | | |
| | 0.37 | 5.17 | 36.5 | − − − − − | − − − − − | − − − − − | − − − − − | − − − − − | − − − − − |
| | 0.40 | 5.06 | 36.1 | − − − − − | − − − − − | − − − − − | − − − − − | − − − − − | − − − − − |
| | 0.43 | 4.89 | 37.0 | − − − − − | − − − − − | − − − − − | − − − − − | − − − − − | − − − − − |
| Granules of sorbic acid powder average particle size 147 microns) | 0.23 | 5.46 | 36.1 | + + + + + | | | | | |
| | 0.27 | 5.44 | 36.1 | + + − − − | + + + + + | | | | |
| | 0.30 | 5.31 | 36.5 | − − − − − | + + + − − | + + + + − | + + + + + | | |
| | 0.33 | 5.25 | 37.2 | − − − − − | + − − − − | + + − − − | + + + + − | + + + + + | |

TABLE 5-continued

| Test lots (amount added, %) | | pH | Water content (%) | Storage period (days at 30° C.) | | | | | |
|---|---|---|---|---|---|---|---|---|---|
| | | | | 15 | 30 | 45 | 60 | 75 | 90 |
| | 0.37 | 5.13 | 36.2 | — — — — — | — — — — — | — — — — — | — — — — — | — — — — — | — — — — — |
| | 0.40 | 5.05 | 37.2 | — — — — — | — — — — — | — — — — — | — — — — — | — — — — — | — — — — — |
| | 0.43 | 4.92 | 37.3 | — — — — — | — — — — — | — — — — — | — — — — — | — — — — — | — — — — — |
| Granules of fine powder of sorbic acid (average particle size 37 microns) | 0.23 | 5.49 | 37.1 | + + + + + | | | | | |
| | 0.27 | 5.47 | 36.5 | — — — — — | + + + + + | | | | |
| | 0.30 | 5.36 | 36.2 | — — — — — | — — — — — | — — — — — | — — — — — | — — — — — | — — — — — |
| | 0.33 | 5.29 | 37.1 | — — — — — | — — — — — | — — — — — | — — — — — | — — — — — | — — — — — |
| | 0.37 | 5.18 | 36.1 | — — — — — | — — — — — | — — — — — | — — — — — | — — — — — | — — — — — |
| | 0.40 | 5.05 | 36.2 | — — — — — | — — — — — | — — — — — | — — — — — | — — — — — | — — — — — |
| | 0.43 | 4.90 | 37.0 | — — — — — | — — — — — | — — — — — | — — — — — | — — — — — | — — — — — |
| Not added | | 6.54 | 36.5 | + + + + + | | | | | |

What we claim is:

1. A method for producing a semi-moist pet food with good storage stability having a water content of 20 to 45 percent by weight and a pH of 6.0 or below, a sugar and/or sugar alcohol content of not more than 20 percent by weight and a propylene glycol content of not more than 3 percent by weight, which consists essentially of:
    admixing, with pet food materials, 0.1% to 0.7% by weight of granules consisting essentially of a mixture of more than 60% by weight of a fine powder of sorbic acid having a particle size smaller than 250 Tyler's mesh and another ingredient selected from the group consisting of a binding agent, a mixture of a binding agent and a surfactant, and a mixture of a binding agent and an organic acid, acidic organic acid salt or acidic inorganic acid salt, said organic acid, acidic organic acid salt and acidic inorganic acid salt being solid at room temperature, to disperse the sorbic acid powder uniformly in said materials, said granules having a particle diameter of 300 to 1500 microns; and
    heating the admixture simultaneously with the admixing.

2. The method of claim 1 wherein said organic acid is fumaric acid, malic acid, tartaric acid, citric acid, adipic acid, succinic acid, lactic acid, or gluconic acid.

3. The method of claim 1 wherein the solid organic acid is fumaric acid, malic acid, tartaric acid, citric acid, adipic acid, succinic acid, or gluconic acid, the acidic salt of an organic acid is sodium fumarate or sodium citrate, and the acidic salt of the inorganic acid is monosodium phosphate or sodium acidic pyrophosphate.

4. The method of claim 1 wherein the solid organic acid contained in the granules is in the form of fine particles having a particle diameter of less than 250 Tyler's mesh.

5. A method for producing a semi-moist pet food with good storage stability having a water content of 20 to 45 percent by weight and a pH of 6.0 or below, a sugar and/or sugar alcohol content of not more than 20 percent by weight and a propylene glycol content of not more than 3 percent by weight, which consists essentially of:
    admixing, with pet food materials, 0.1% to 0.7% by weight of granules consisting essentially of a mixture of more than 60% by weight of a fine powder of sorbic acid having a particle size smaller than 250 Tyler's mesh and another ingredient selected from the group consisting of a binding agent, a mixture of a binding agent and a surfactant, and a mixture of a binding agent and an organic acid, acidic organic acid salt or acidic inorganic acid salt being solid at room temperature, to disperse the sorbic acid powder uniformly in said materials, said granules having a particle diameter of 300 to 1500 microns; and
    heating the admixture after the admixing.

6. The method of claim 5 wherein said organic acid is fumaric acid, malic acid, tartaric acid, citric acid, adipic acid, succinic acid, lactic acid, or gluconic acid.

7. The method of claim 5 wherein the solid organic acid is fumaric acid, malic acid, tartaric acid, citric acid, adipic acid, succinic acid or gluconic acid, the acidic salt of an organic acid is sodium fumarate or sodium citrate, and the acidic salt of the inorganic acid is monosodium phosphate or sodium acidic pyrophosphate.

8. The method of claim 5 wherein the solid organic acid contained in the granules is in the form of fine particles having a particle diameter of less than 250 Tyler's mesh.

* * * * *